TONE ARM MOUNTING FOR GRAMOPHONES

Filed Sept. 10, 1954 2 Sheets-Sheet 1

Inventors:-
Harry Da Costa,
James Alexander Lee,
By:-William C. Bugly
Attorney.

TONE ARM MOUNTING FOR GRAMOPHONES

Filed Sept. 10, 1954 2 Sheets-Sheet 2

Inventors:-
Harry Da Costa,
James Alexander Lee,
By:- William E P Bayly
Attorney.

United States Patent Office 2,896,953

Patented July 28, 1959

2,896,953

TONE ARM MOUNTING FOR GRAMOPHONES

Harry da Costa, Snaresbrook, London, and James Alexander Lee, Walthamstow, London, England, assignors to The Plessey Company Limited, Ilford, England, a British company Application September 10, 1954, Serial No. 455,213

Claims priority, application Great Britain September 17, 1953

12 Claims. (Cl. 274—15)

This invention relates to gramophones particularly, but not exclusively, to a three-speed drive, which has for its object to provide a needle positioning guide to ensure the correct positioning of the pick-up arm at the commencement of the sound track for use with say 7", 10" and 12" records.

Another object of this invention is to provide means for switching on the motor of the gramophone simultaneously with the positioning of the needle.

According to this invention the device for positioning the tone arm for playing various sized records consists of an actuating means for imparting radial movement of a tone arm into a number of selected positions, and mechanical means are provided for operatively engaging with the pick-up arm to control the movement of said arm, whereby the needle engages a record placed upon the turntable at the commencement of the sound track. Thus, for example, in the case of the conventional 7", 10" and 12" records the movement of the tone arm into the playing position is dependent upon the size of the record placed upon the turntable.

The actuating means for moving the tone arm radially may consist of a finger cam or the like which is operated by a common member to engage with a stop or the like on the pick-up arm. Said member also moves vertically a ramp with notches therein, whereby the free end of the pick-up arm is raised and slides over the ramp into one of the notches.

The mechanical means for controlling the movement of the tone arm in accordance with the size of the record on the turntable, preferably consists of two vertical members which are pivotally connected together through the lever. One member engages with a stepped portion on the pick-up arm, and the other lever is stepped to engage with the under surface of a 10" or 12" record. The movement of these members is by the same common member operating the actuating means herein set forth. The amount of movement of the stepped member controls the movement of the other member so as to engage in the selected step integral with the pick-up arm. For a 12" record it is at a minimum and for a 7" record at a maximum, whereas the amount of vertical movement of the other member is vice versa, and an intermediate position is provided for both members for a 10" record.

A feature of the invention is that means are provided in association with the common member, for example, a switch which is operated simultaneously with the actuating means and mechanical means.

The invention will now be described with reference to the accompanying drawing in which.

Figure 1:
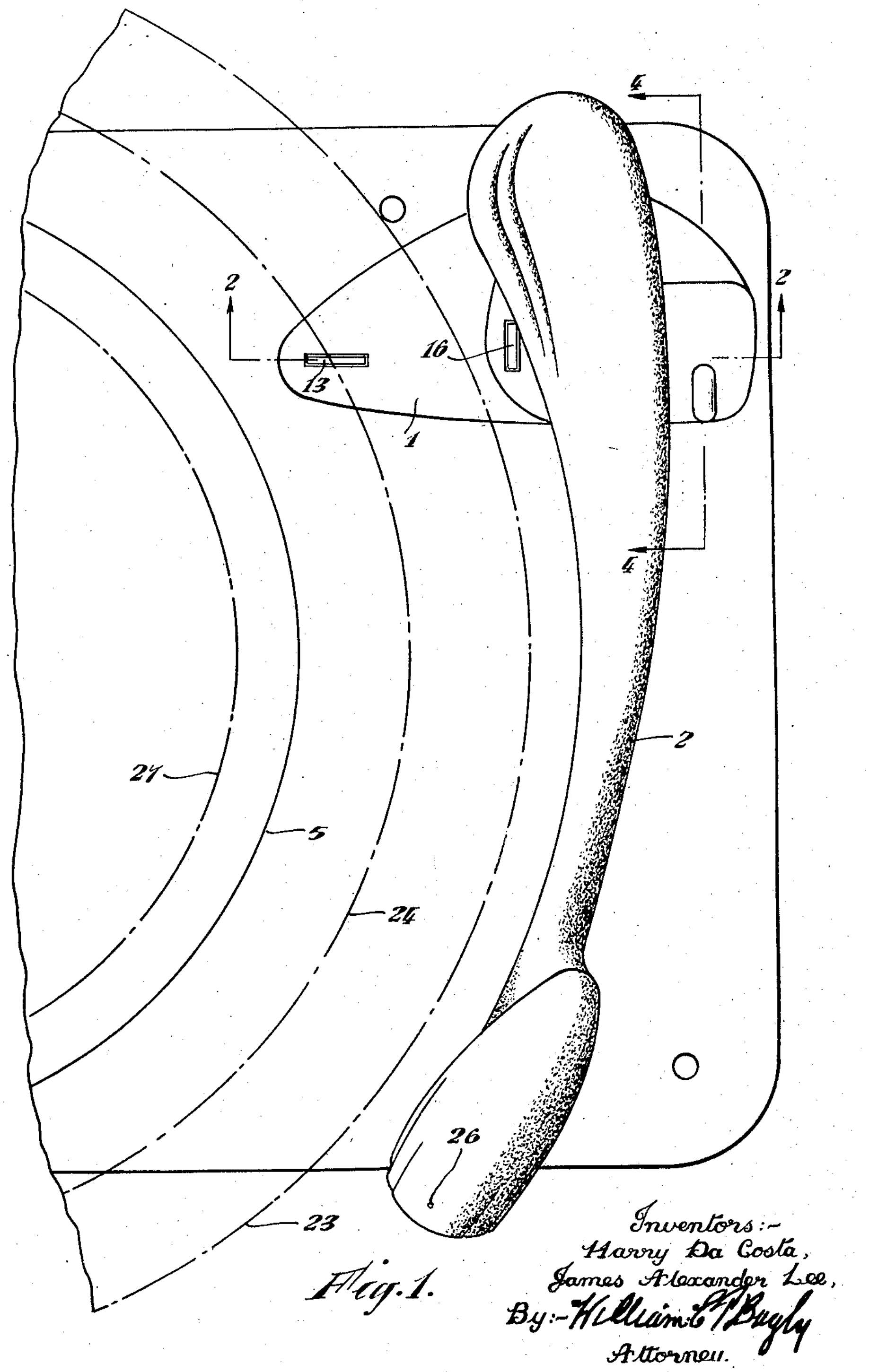
Fig. 1 is a plan view of a pick-up arm and needle positioning device according to the invention.

Referring to the drawing:

A housing 1 is provided for housing the needle positioning device and also rotatably supporting a pick-up arm 2.

Figure 4:
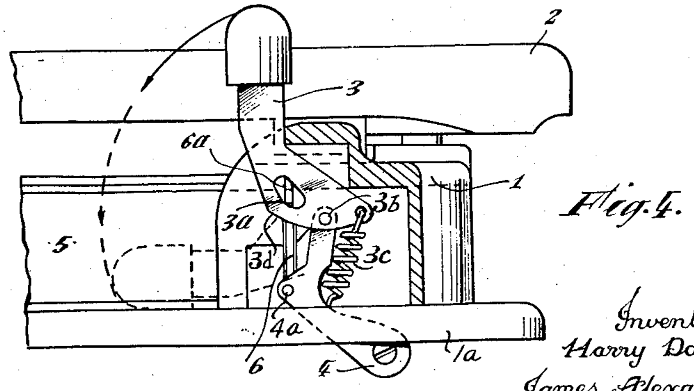
Fig. 4 is a section on the line 4—4 of Fig. 1.

A manually operated spring loaded lever 3 pivotally mounted on a pin $3^b$ in the housing 1 is connected to a switch operating lever 4 for starting up the motor (not shown) for driving the turntable 5. This switch operating lever is also pivoted on the pin $3^b$, which is fixed in housing 1, and the lever 3 is normally urged to the position shown in Fig. 4 by a spring $3^c$ attached to the phonograph base plate $1^a$ to which the housing 1 is secured. The switch-operating lever 4 has a stud $4^a$, which projects into the path of lever 3 so that when the lever 3 is fully depressed, its edge $3^d$ will, towards the end of this depression movement, strike the stud $4^a$, thereby moving the lever 4 in an anticlockwise direction, referring to Fig. 4.

Figure 2:
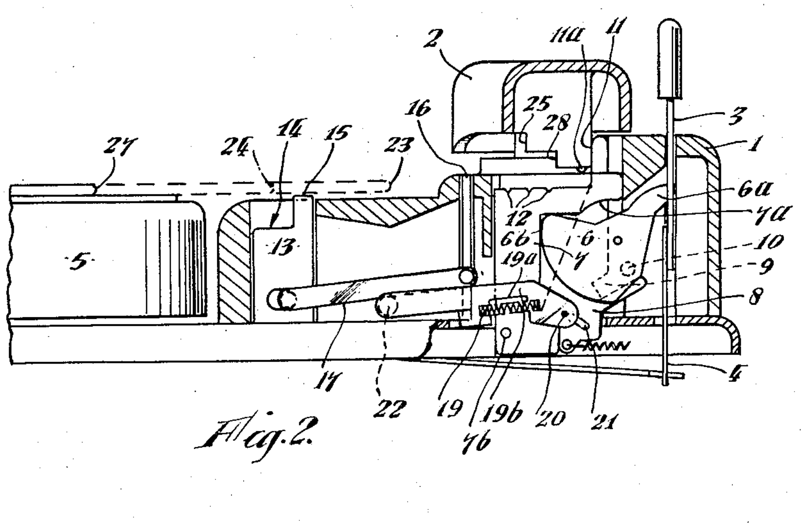
Fig. 2 is a section on the line 2—2 of Fig. 1.
Figure 3:
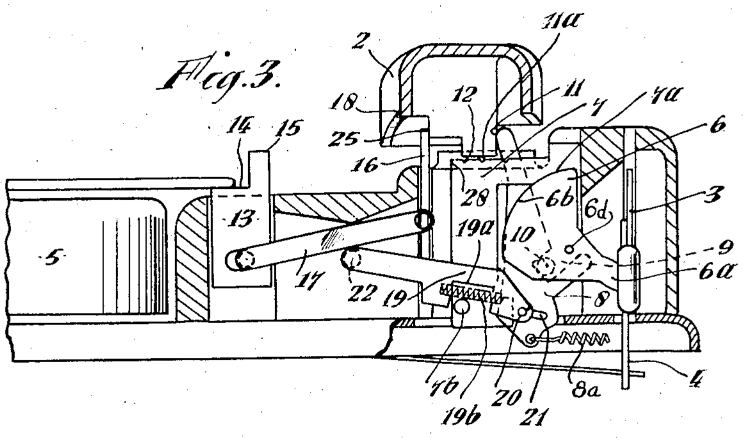
Fig. 3 is a view similar to Fig. 2 of the positioning device in the operative position for 10" records.

A member 6 pivoted on a pin $6^d$ in the housing 1, has an arm $6^a$ passing through a slot $3^a$ in the lever 3, and a ramp 7 slides vertically in said housing 1 by means of said member 6 being formed with an edge cam $6^b$ engaging with an edge cam surface $7^a$ formed on the underside of the ramp 7 for the purpose herein set forth. The member 6 is also provided with a pin carrying a roller 10 which engages a slot 9 in a pusher lever 8. A pin 20, fixed in the housing 1, extends through a slot 21 in the lever 8, and a spring $8^a$ biases the lower end of this lever to the right (referring to Figs. 2 and 3), so that the lever 8 will normally pivot about the left-hand end of the slot 21. The direction and width of the slot 9 are so chosen that in the rest position of lever 8 as shown in Fig. 2—and substantially until the circular part $6^b$ of the edge of member 6 co-operates with the circular edge cam surface $7^a$ on the underside of the ramp, thus terminating the upward movement of this ramp—the roller 10 will move along the slot 9 without producing appreciable movement of lever 8. After this however, when the arm 2 has been lifted by the ramp 7, the roller 10 causes the lever 8 to tilt in an anticlockwise direction and thereby push the arm 2 towards the centre of the turntable 5.

A spring loaded rotary finger cam 8 has a slot 9 on one edge for receiving a roller 10 mounted upon the member 6, whereby movement of the member 6 causes the ramp 7 to move vertically, which is followed by the movement of the finger cam 8 due to the lost motion between the roller 10 and slot 9. A stop 11 depending from the pick-up arm 2 is engaged by the upper end of the finger cam 8. The result of the combined movement of the ramp 7 and finger cam 8, enables the pick-up arm 2 to be raised and moved into the selected position, which is indicated by notches 12 at the top of the ramp 7. Said notches co-operate with indexing projections $11^a$ on the underside of the stop 11.

A feeler plate 13 with two steps 14, 15 at the top, slides in the housing 1 at the periphery of the turntable 5. The turntable is less than ten inches in diameter, so that step 14 will engage with the under surface of a 10" record, and the step 15 with a 12" record when placed on the turntable. A plate 16 also sliding vertically in the housing 1 is loosely connected by a link 17 to the feeler plate 13 to co-operate with a series of stepped undercuts 18, 25, 28, provided in the pick-up arm 2. It will be appreciated that once the stop plate 16 has been engaged by one of these stepped undercuts, the upper end of lever 8 cannot move further to the left although the movement of roller 10 is liable to continue. The co-operation of the pin 20 with the slot 21 in conjunction with the provision of the spring $8^a$ enables the finger cam or pusher lever 8 to yield, the lower end of the lever 8 moving to the left against the action of the spring $8^a$, with the slot 21 moving across the pin 20.

A pawl 19 is pivoted at one end on the pin 20 which carries the finger cam 8 through a pin and slot connection 20, 21, and the opposite end of ball 19 has a runner 22 which engages with an intermediate section of the link 17 for the purpose of raising both the feeler plate 13 and rod 16. Said pawl 19 has a gated slot 19ᵃ for supporting a closely wound helical spring 19ᵇ, and a stop 7ᵇ projecting from one face of the ramp 7, engages with the spring 19ᵇ when the ramp 7 is lifted to enable the runner 22 to contact the link 17.

Assuming a 12″ record 23 is placed upon the turntable 5, the hand lever 3 is depressed to move the switch operating lever 4, raise the ramp 7 and rotate the finger cam 8 in sequence; at the same time, the feeler plate 13 rises vertically until the top step 15 contacts with the undersurface of the record 23, while the plate 16, due to its weight remains at rest. Then further movement of the feeler plate 13 is arrested, the plate 16 also moves vertically into the face of the highest step 18 to stop inward movement of the tone arm to when the playing needle 26 is placed at the commencement of the sound track of a 12″ record. In the case of a 10″ record 24, the movement of the feeler plate 13 continues until the lower step 14 contacts the undersurface of the record 24 and thereby the movement of the plate 16 is reduced so as to engage with the face of the next step 25 thus increasing the swing of the pick-up arm 2 to enable the needle 26 to engage at the commencement of the sound track of the 10″ record 24. For a 7″ record 27, the feeler plate 13 is free to move to its maximum extent and the rod 16 its minimum, to engage with the face of the lowermost step 28 on the pick-up arm 2 whereby the pick-up arm can swing radially across the turntable 5 into the selected position.

We claim:

1. A device for positioning a gramophone tone arm, comprising a base member, a platform mounted in said base member for up and down movement and having a horizontal surface for supporting the tone arm in a radially slidable manner, a pusher member for radially moving the tone arm across said platform, a manually operable actuating member movable between a first and second position, and means for operatively coupling said actuating member to said platform and pusher member respectively, said coupling means being so constructed as to raise, during the initial part of the movement of the actuating member from said first position to said second position, said platform to engage and lift the tone arm while leaving the pusher member clear of the tone arm, and to operate during the further part of such movement of said actuating member, said pusher member to slide the tone arm across said platform, while return movement of the actuating member from the second position to the first causes the platform to be lowered out of engagement with the tone arm.

2. A tone arm mounting for a gramophone, comprising a tone-arm support, a tone arm mounted on said support for pivotal movement in a horizontal plane, radially of the gramophone, and for additional pivotal movement about a horizontal axis, towards and away from the record surface, in co-operative combination with a positioning device as claimed in claim 1, said tone arm having an indexing member for sliding co-operation with the top surface of said platform, and the top surface of said platform being provided with at least one indexing recess for self-centering co-operation with said indexing member to accurately locate and retain the arm in a predetermined position of its radial movement when, and only when, the tone arm rests on said platform.

3. A device as claimed in claim 1 wherein said actuating member comprises a lever movable about a fulcrum between two positions and operatively coupled to the platform member by a pair of co-operating cam surfaces on said lever and member respectively, the configuration of said surfaces being such that the lifting of the platform member is substantially completed in part of the movement of said lever, and having a pin projecting laterally at a distance from the fulcrum axis of said lever and engaging a slot in the pusher member, said slot extending substantially in the mean direction of movement of said pin during said initial part of the movement of the said lever.

4. A device as claimed in claim 1, further comprising a stop member for co-operation with the tone arm to positively limit the movement imparted thereto by the pusher member, at least one element of the group including the pusher member, the actuating member and the means for operatively inter-connecting said actuating and pusher members, including an elastic element which will yield when movement of the actuating member is continued when the tone arm has reached said stop member.

5. In a positioning device for gramophone tone arms, the combination with the tone arm of a stop member movable transversely to the positioning movement of the tone arm, said tone arm and stop member being provided with complementary stop surface means, at least one of said stop surface means comprising a plurality of stop surfaces offset from each other both in the direction of said positioning movement and in the direction in which said stop member is movable, a manually operable actuating member, selective setting means operatively connected to said actuating member for selectively moving said stop member into one or the other of a plurality of operative positions to render one or other of said mutually offset stop surfaces operative for selectively limiting the positioning movement of the tone arm and for then withdrawing the stop member to permit movement of the tone arm beyond the position determined by the stop, and record-size feeler means operatively connected with said actuating member to selectively vary said operative connection to automatically determine the said operative position of the stop member, according to the size of the record to be played.

6. In a tone-arm positioning device for turntable gramophones, a stop member movable axially of the turntable to a plurality of operative positions for selectively stopping the tone arm at one or other of a plurality of positions according to the position of the stop member, a feeler member movable axially of the turntable and having a plurality of stops arranged at different radial distances outside the periphery of the turntable, said stops having progressively different lengths in the direction of the feeler movement according to said different radial distances, an actuating element for moving said stop member and said feeler member towards the plane of the turntable, and differential means including a floating lever for distributively transmitting movement from said actuating element to said feeler member and to said stop member.

7. In a tone-arm positioning device for turntable gramophones, the combination comprising a tone arm, a base member, a platform mounted in said base member for up and down movement and having a horizontal surface for supporting the tone arm in a radially slidable manner, a pusher member for radially moving the tone arm across said platform, and an actuating member movable between a first and second position, said actuating member being operatively coupled to said platform and pusher member respectively in such manner that the initial part of the movement of the actuating member from said first position to said second position raises said platform to engage and lift the tone arm while leaving the pusher member clear of the tone arm, and that the further part of such movement of said actuating member operates said pusher member to move the tone arm across said platform, the group comprising said pusher member and the means for coupling said pusher member to the actuator member including a resiliently yielding element, the combination including means for coupling said floating lever with said platform to render said stop member operative when said platform is raised.

8. In a tone-arm positioning device for turntable gramophones, a stop member movable transversely of the positioning movement of the tone arm to a plurality of operative positions for selectively stopping the tone arm at one or other of a plurality of positions according to the position of the stop member, a feeler member movable axially of the turntable and having a plurality of stops arranged at different radial distances outside the periphery of the turntable, said stops having progressively increasing lengths in the direction of the feeler movement according to the increasing radial distances, an actuating element for moving said stop member and said feeler member towards the plane of the turntable, and differential means for distributively transmitting movement from said actuating element to said feeler member and to said stop member, the amount of movement transmitted to the stop member being increased when said feeler member is stopped.

9. In a device for positioning a gramophone tone arm, the combination comprising a stop member movable transversely to the direction of the positioning movement of the arm, a feeler member movable perpendicularly to the plane determined by said direction and the radius of the arm movement, said feeler member having a plurality of stop surfaces spaced both longitudinally and transversely of the feeler movement for respective engagement with records of different diameters, an actuating element for moving both said stop member and said feeler member, and differential mechanism operatively inter-connecting said actuating element, said feeler member, and said stop member.

10. In a disc-record player having a turntable, a tone arm, and a tone-arm positioning device, the combination of a stop member guided for up and down movement for co-operation with the tone arm, a feeler plate arranged radially of the turntable outside the periphery thereof for up and down movement and formed at its upper edge with a plurality of abutment surfaces for respective engagement with records of different diameters, a movement distributor lever extending between, and pivotally coupled to, said stop member and said feeler plate, and means operated when said positioning device is actuated, for raising a fulcrum point of said distributor lever to raise that stop selectively to one or other of a number of different height levels according to the size of record in use on the turntable.

11. A device as claimed in claim 1, including an electric on-off switch for the gramophone drive, and actuating means, for said switch, operatively coupled with said actuating member.

12. In a disc-record gramophone having a turntable for carrying the disc-record to be played, a tone arm movable radially of the turntable, and a tone-arm positioning device for placing the tone arm onto such disc record at one or other of a number of predetermined radial positions selected according to the diameter of such record: a rigid record-size feeler movable axially of the turntable and having at least two stops arranged at different radial distances outside the turntable, projecting upwardly by distances increasing according to said radial distance of each stop, thus terminating the feeler movement after a length of stroke dependent upon the record size, and means for controlling the positioning movement according to the length of said stroke.

References Cited in the file of this patent

UNITED STATES PATENTS

| | | |
|---|---|---|
| 2,305,086 | Johnson | Dec. 15, 1942 |
| 2,563,653 | Lingenbrink | Aug. 7, 1951 |

FOREIGN PATENTS

| | | |
|---|---|---|
| 693,594 | Great Britain | July 1, 1953 |
| 615,158 | Great Britain | Jan. 3, 1949 |